Oct. 24, 1961  J. L. TEAL  3,005,502
SEED FURROW PLOW

Filed June 12, 1959  3 Sheets-Sheet 1

Joseph L. Teal
INVENTOR.

BY *Clarence A. O'Brien*
*and Harvey B. Jacobson*
Attorneys

Oct. 24, 1961 J. L. TEAL 3,005,502
SEED FURROW PLOW
Filed June 12, 1959 3 Sheets-Sheet 2
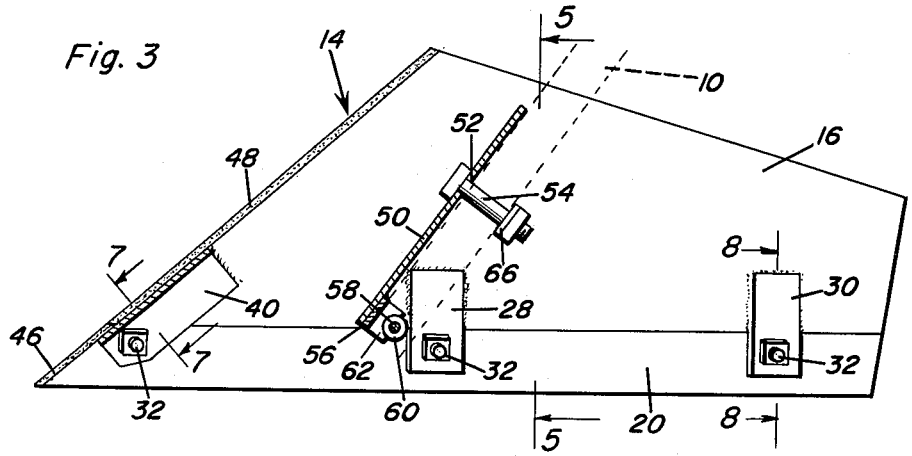
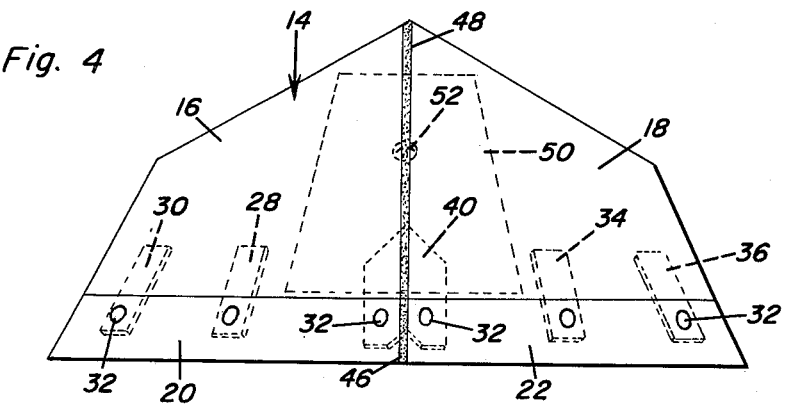
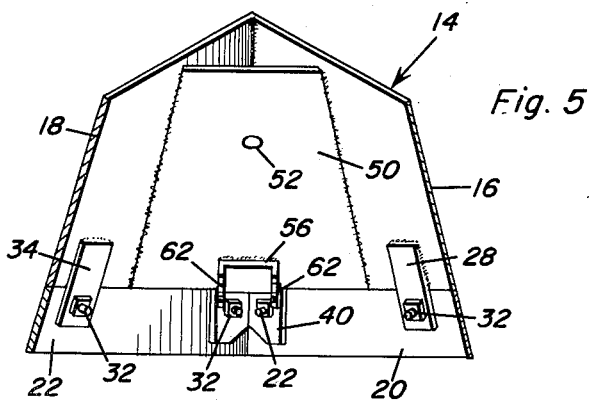
Joseph L. Teal
INVENTOR.

Oct. 24, 1961 J. L. TEAL 3,005,502
SEED FURROW PLOW

Filed June 12, 1959 3 Sheets-Sheet 3

Joseph L. Teal
INVENTOR.

BY *Clarence A. O'Brien*
*and Harvey B. Jacobson*
Attorneys

United States Patent Office 3,005,502
Patented Oct. 24, 1961

3,005,502
SEED FURROW PLOW
Joseph L. Teal, 1919 31st St., Lubbock, Tex.
Filed June 12, 1959, Ser. No. 820,013
4 Claims. (Cl. 172—726)

This invention relates to farm implements and more particularly to a seed furrow plow.

In the final preparation of a tract of land for planting of most row crops, such as grain sorghums, cotton, and corn, the land is plowed in a manner that leaves it in a corrugated condition, consisting of a sequence of furrows and ridges. The ridges are commonly called beds or middles. The furrows are usually from 36 inches to 40 inches apart, and the bottom of these furrows are usually from 7 inches to 9 inches below the top of the ridges.

To prepare land in this manner, the farmer attaches one or more beams to his tractor, depending on the number of furrows he desires to make each time he passes through the field. These beams are usually spaced from 36 inches to 40 inches apart. On each beam is bolted a device commonly called a lister bottom which plows into the ground to the desired depth, throwing soil both right and left, leaving a furrow in the wake of each lister bottom, and forming ridges or beds in between.

The land is prepared in this manner considerably in advance of planting time in order that the anticipated earlier rains, or irrigation if available, will wet these beds and settle the soil to put it in better condition for planting.

When planting this land, the farmer's operation is similar to his prepartion of the land for planting. The farmer opens these beds and deposits his seed in them in rows, using the same lister bottom as in the previous operation, because previously there has been no other type of opening plow manufactured for this particular purpose. Consequently, after he has finished planting this land, it has almost the same physical appearance as it had before it was planted.

The conventional lister bottom which the farmer has heretofore been compelled to use for planting, plows beneath considerable fertile soil, pushing it to either side in ridges. The seed is then deposited below and out of reach of this soil and to depths where the less fertile soil is colder, resulting in a retarded germination of the seed and growth of the plant.

The planter bottom in accordance with this invention will enable the farmer to plant his seed at much less depth, thereby leaving this fertile soil under the seed, where it will be available to the plant after germination.

When the seed is planted down in furrows, the normal rain that might follow soon after the planting, as it usually does, will wash in additional soil from these middle ridges onto the seed, covering them so deep the plants will not sprout through so much soil. It is then necessary to replant, and the farmer must use the same lister bottom for replanting; this replanting being done by opening the new beds made during the previous planting operation. Then should another rain follow soon after this second planting, it is again necessary to replant. Many farmers in most row crop areas experience this loss every year, and the cost of replanting such crops totals up to a terrific sum, in addition to making his crop from three to six weeks late, shortening his production season.

This new planter bottom will eliminate this danger of having to replant because of later rains. With its use, the ground is left almost level, making it impossible for soil to wash in on the seed. Instead, the rain will wash off some of the soil put on the seed by the covering plows, hastening the seeds' germination and appearance through the ground.

At times the farmer finds it necessary to plant his crops when the soil is slightly drier than it should be. In that soil condition the farmer strives to push aside the dry surface soil, to a depth at which the soil is sufficiently wet to germinate the seed. The conventional lister bottom will not do this properly, but will leave this dry soil on the edge of the furrow, and the covering plows following immediately behind will pull this dry soil in and deposit it on the seed, thereby adversely affecting germination.

The new planter bottom will push this dry soil out of reach of the covering plows, enabling them to pull in wet soil with which to cover the seed.

Since this new planter bottom disturbs considerably less soil than the conventional lister bottom, it requires less power to operate, thereby adding to the farmer's economy.

Accordingly, a general object of the invention is to provide a plow to enable more effective and efficient planting and to realize a greater yield for the same time and effort and expense as using ordinary, commercially available equipment and usual planting techniques.

A further object of the invention is to provide a device enabling seeds to be planted on a level rather than in the middle of a furrow and thereby obviate the possibility of rain washing the sides of the furrows over the planted seed.

Another object of the invention is to provide a plow which has a pair of plow blades connected at the front to form an apex, togther with a pair of sides which extend upwardly and inwardly and to which the blades are bolted or otherwise secured, and means connected to the sides for securing the sides to conventional plow beams. The lower edges of the blades are coplanar leaving the ground almost level during the use of the plow and making it impossible for soil to wash on the seed after the seed is planted.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical, longitudinal sectional view taken on the line 3—3 of FIGURE 2.

FIGURE 4 is a front view of the plow in FIGURE 1.

FIGURE 5 is a vertical transverse sectional view taken on the line 5—5 of FIGURE 3.

Figure 1:
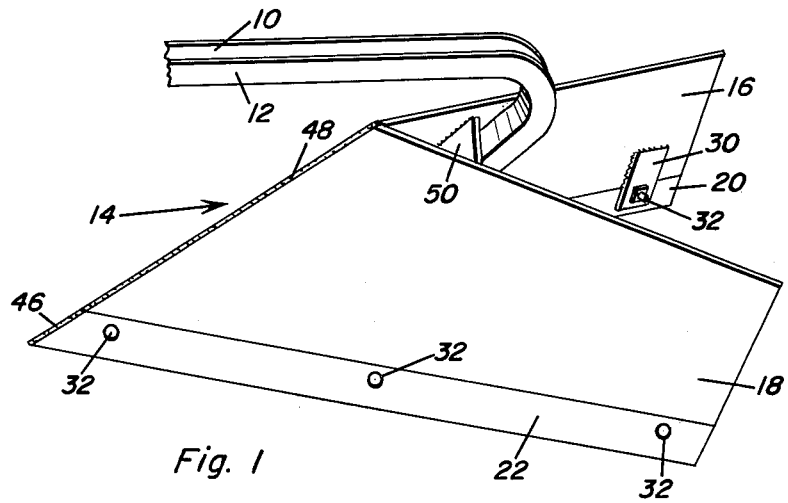
FIGURE 1 is a perspective view of the plow constructed in accordance with the invention and showing it attached to conventional plow beams, certain concealed parts being shown in dotted lines.
Figure 2:
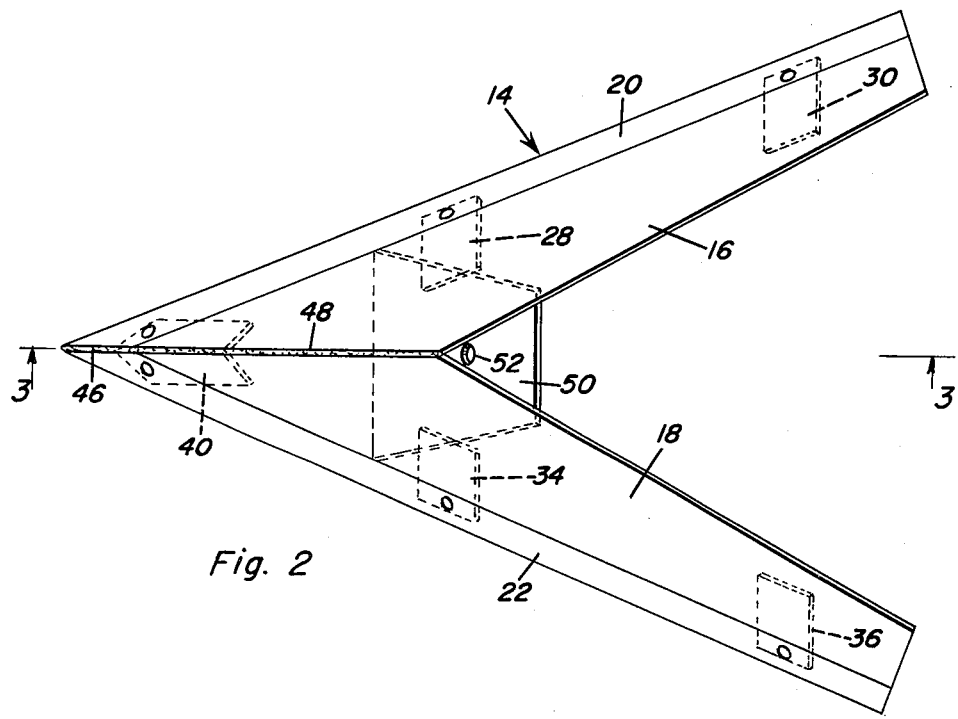
FIGURE 2 is a top view of the plow in FIGURE 1.

In the accompanying drawings a conventional plow beam 10, of U-shape in cross-section with side walls 12 is shown in FIGURE 1. Plow 14 is constructed in such a way as to enable improved planting conditions as set forth in the preamble herein. In order to be practical, a plow must be serviceable and of simple construction. Plow 14 meets these requirements and includes only a minimum number of parts and components.

Figure 6:
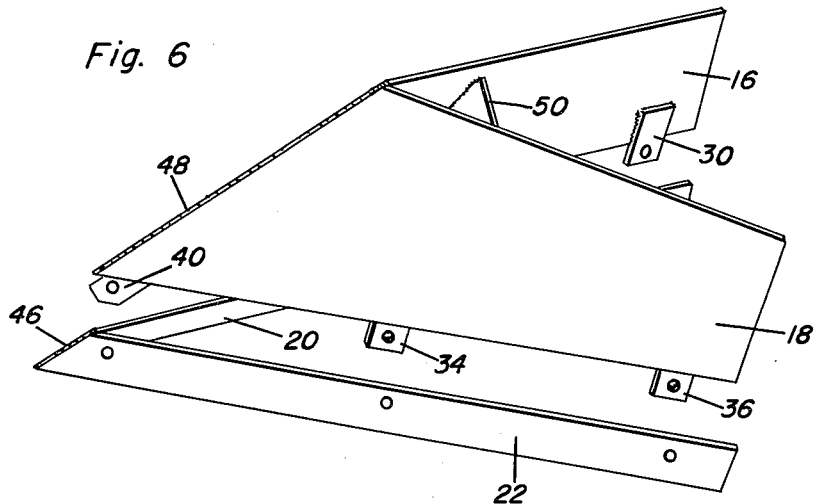
FIGURE 6 is an exploded perspective view of the blades and sides of the plow.

Plow 14, see also FIGURE 6, has two identical sides 16 and 18, each of which is made of flat or plate stock and when viewed from the side, each is quadrilateral. A pair of elongate blades 20 and 22 are secured to the lower edges of sides 16 and 18, and the lower edges of blades 20 and 22 are made sharp. The blade fastening means connecting the blades to sides 16 and 18 are seen best in FIGURES 3, 7 and 8. Two flat plates 28 and 30 are welded to the inner surface of side 16, and the lower parts of plates 28 and 30 overlie a portion of the inside surface of blade 20. Standard plow bolts and nuts 32 are used to connect blade 20 with the plates 28 and 30. Plates 34 and 36 which are identical to plates 28 and 30, are welded or otherwise fixed to the inside surface of side 18 and overlie a portion of the inside surface of blade 22. Standard bolts and nuts 32 are used to attach blade 22 to plates 34 and 36.

Figure 7:
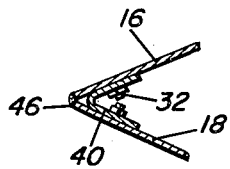
FIGURE 7 is a transverse sectional view taken on the line 7—7 of FIGURE 3.
Figure 8:
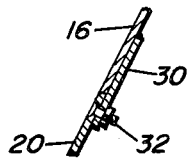
FIGURE 8 is a vertical, transverse sectional view taken on the line 8—8 of FIGURE 3.

The leading edge of the plow is strengthened and supported by means of bracket 40 which is angular in cross-section (FIGURE 7). The upper part of bracket 40 is welded to both sides 16 and 18 of the plow, and the lower part of this bracket fits flush against the inside surface of blades 20 and 22. Bolts and nuts 32 extending through apertures in blades 20 and 22 and through apertures in bracket 40 secure the blades 20 and 22 to sides 16 and 18 at the front edges thereof. In addition to this the confronting leading edges of blades 20 and 22 are joined by weld 46 which forms a continuation of the weld 48 which joins the leading edges of sides 16 and 18 (FIGURE 3).

The plow beam 10 diagrammatically represents something conventional to which the plow 14 is secured. This will usually be a plow beam and therefore plow beam 10 is selected for illustration. The lower ends of the plow beam rests against the rear surface of a transverse gusset 50 which is welded at its edges to portions of the inside surfaces of sides 16 and 18. There is an aperture 52 in gusset 50 through which bolt 54 extends, this bolt being used to secure the plow beam in place on the gusset. A small channel 56 is welded to the lower part of gusset 50 and is in alignment with bolt 54 so that the plow beam may extend therethrough. Bolt 58 extending transversely through apertures in the plow beam 10, is equipped with a pair of short cylindrical washers 60 that seat in notches 62 in the sides of the channel 56. Accordingly, the channel forms a pocket to receive the plow beams, and bolt 58 passing through aligned apertures in the lower extremities of the plow beams and extending through the bores of the short cylindrical washers 62, retains the lower ends of the plow beams firmly secure and in place at the lower part of gusset 50. Bolt 54 is a large bolt and has a substantial washer 66 backing the nut thereon and bearing against the lower edges of the plow beams.

The use, advantages and operation of the invention have been discussed previously. It is emphasized, however, that this plow when used in accordance with the disclosure herein advances the art of farming by increasing the yield and by avoiding considerable rain damage and difficulties. Instead of the ordinary planting techniques which have been followed for numerous years, this plow prepares the land level rather than in furrows so that the seed may be planted level rather than in the middle of a furrow.

The specifications of a plow which has been successfully used to achieve the objects of this invention, employed quarter inch steel blades 20 and 22 welded at a 45° angle at the bottom and the angle increasing with ascent. The sides 16 and 18 were also constructed of quarter inch iron welded at a 60° angle at the top with the angle decreasing with descent. The entire front of the plow sides and blades inclined at an angle of 45°.

The foregoing is considered as illustrative only of the principles of the invention. Further, since numerous modification and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in seed planting to prepare the land prior to actual deposit of the seed, a seed furrow plow which prepares the lands on a level sufficient for planting as opposed to forming furrows within which to plant the seed as is customary, said plow having a pair of sides of polygonal outline and having forward edges which are sloped upwardly and rearwardly, a pair of blades secured beneath and extending along the entire length of and being coterminous with the lower edges of said sides and having essentially coplanar lower edges disposed below all other portions of the plow whereby to leave a smooth bottom surface in the furrow and upwardly and rearwardly inclined leading edges, said leading edges of said blades and the front edges of said sides forming a straight apical line, means secured to and extending transversely between said sides and to which to fasten a plow beam, means including plates secured to the inner surfaces of said sides and blades for fastening said blades to said sides, an angle bracket secured to the inner surfaces of said sides and blades at the front edges thereof and overlying a portion of the inside surfaces of said blades for securing the front portions of said blades together and for rigidifying said sides at said apical line, said plow beam securing means comprising a flat plate extending across the space between said sides and having its ends secured to the latter, said plate being tilted to the vertical and being inclined upwardly and rearwardly, a fastening bolt extending through said plate and said plow beam.

2. For use in seed planting to prepare the land prior to actual deposit of the seed, a seed furrow plow which prepares the lands on a level sufficient for planting as opposed to forming furrows within which to plant the seed as is customary, said plow having a pair of sides of polygonal outline and having forward edges which are sloped upwardly and rearwardly, a pair of blades secured beneath and extending along the entire length of and being coterminous with the lower edges of said sides and having essentially coplanar lower edges disposed below all other portions of the plow whereby to leave a smooth bottom surface in the furrow and upwardly and rearwardly inclined leading edges, said leading edges of said blades and the front edges of said sides forming a straight apical line, means secured to and extending transversely between said sides and to which to fasten a plow beam, means including plates secured to the inner surfaces of said sides and blades for fastening said blades to said sides, an angle bracket secured to the inner surfaces of said sides and blades at the front edges thereof and overlying a portion of the inside surfaces of said blades for securing the front portions of said blades together and for rigidifying said sides at said apical line, said plow beam securing means comprising a flat plate extending across the space between said sides and having its ends secured to the latter, said plate being tilted to the vertical and being inclined upwardly and rearwardly, a fastening bolt extending through said plate and said plow beam, said plate having a channel shaped bracket at its lower end and on the rearward face thereof, said bracket receiving the lower end of said plow beam therein.

3. The plow of claim 2 wherein said blades are joined together at a 45° angle and with said angle increasing with ascent, said sides connected together at a 60° angle at the top thereof and said 60° angle decreasing with descent, and the entire front portion of the plow defined by said apical line inclining at a 45° angle with reference to a horizontal plane.

4. For use in seed planting to prepare the land prior to actual deposit of the seed, a seed furrow plow which prepares the lands on a level sufficient for planting as opposed to forming furrows within which to plant the seed as is customary, said plow having a pair of sides of polygonal outline and having forward edges which are sloped upwardly and rearwardly, a pair of blades secured beneath and extending along the entire length of and being coterminous with the lower edges of said sides and having essentially coplanar lower edges disposed below all other portions of the plow whereby to leave a smooth bottom surface in the furrow and upwardly and rearwardly inclined leading edges, said leading edges of said blades and the front edges of said sides forming a straight apical line, means secured to and extending transversely between said sides and to which to fasten a plow beam, means including plates secured to the inner surfaces of said sides and blades for fastening said blades to said sides, an angle bracket secured to the inner surfaces of said sides and blades at the front edges thereof and overlying a portion of the inside surfaces of said blades for securing the front portions of said blades together and for rigidifying said sides at said apical line, said plow beam securing means comprising a flat plate extending across the space between said sides and having its ends secured to the latter, said plate being tilted to the vertical and being inclined upwardly and rearwardly, a fastening bolt extending through said plate and said plow beam, said bracket having transversely spaced, rearwardly projecting legs provided with notches therein, the plow beams having projections seating in said notches.

References Cited in the file of this patent

UNITED STATES PATENTS

| | | |
|---|---|---|
| Re. 6,405 | Lane | Apr. 27, 1875 |
| 156,396 | Whittemore | Oct. 27, 1874 |
| 817,812 | Soucek | Apr. 17, 1906 |
| 2,020,841 | Lier | Nov. 12, 1935 |
| 2,036,765 | McCready | Apr. 7, 1936 |
| 2,083,083 | Nielsen | June 8, 1937 |
| 2,094,424 | Cole | Sept. 28, 1937 |
| 2,188,892 | Meyer | Jan. 30, 1940 |
| 2,684,543 | Cundiff | July 27, 1954 |